US008996800B2

(12) United States Patent
Venkatesh et al.

(10) Patent No.: US 8,996,800 B2
(45) Date of Patent: Mar. 31, 2015

(54) DEDUPLICATION OF VIRTUAL MACHINE FILES IN A VIRTUALIZED DESKTOP ENVIRONMENT

(75) Inventors: Chetan Venkatesh, San Mateo, CA (US); Kartikeya Iyer, San Mateo, CA (US); Shravan Gaonkar, Sunnyvale, CA (US); Sagar Shyam Dixit, Sunnyvale, CA (US); Vinodh Dorairajan, Cupertino, CA (US)

(73) Assignee: Atlantis Computing, Inc., Mountain View, CA (US)

( * ) Notice: Subject to any disclaimer, the term of this patent is extended or adjusted under 35 U.S.C. 154(b) by 0 days.

(21) Appl. No.: 13/269,525

(22) Filed: Oct. 7, 2011

(65) Prior Publication Data

US 2013/0013865 A1  Jan. 10, 2013

Related U.S. Application Data

(60) Provisional application No. 61/505,524, filed on Jul. 7, 2011.

(51) Int. Cl.
*G06F 12/00* (2006.01)
*G06F 12/08* (2006.01)
*G06F 17/30* (2006.01)
*G06F 12/12* (2006.01)
*G06F 9/455* (2006.01)

(52) U.S. Cl.
CPC ...... *G06F 12/0808* (2013.01); *G06F 17/30132* (2013.01); *G06F 12/128* (2013.01); *G06F 12/126* (2013.01); *G06F 9/45533* (2013.01)
USPC ................ 711/113; 711/6; 711/135; 711/162

(58) Field of Classification Search
CPC .......................... G06F 3/0641; G06F 12/0804
USPC ........................................ 711/113, 135, 162
See application file for complete search history.

(56) References Cited

U.S. PATENT DOCUMENTS

| | | | |
|---|---|---|---|
| 4,603,380 A * | 7/1986 | Easton et al. ................. | 711/113 |
| 6,675,214 B2 | 1/2004 | Stewart et al. | |
| 6,807,619 B1 | 10/2004 | Ezra et al. | |
| 6,915,302 B1 | 7/2005 | Christofferson et al. | |
| 7,269,608 B2 | 9/2007 | Wong et al. | |
| 7,356,651 B2 | 4/2008 | Liu et al. | |
| 7,571,288 B2 | 8/2009 | Pudipeddi et al. | |
| 7,908,436 B1 | 3/2011 | Srinivasan et al. | |
| 8,117,464 B1 * | 2/2012 | Kogelnik ...................... | 713/193 |
| 8,312,471 B2 | 11/2012 | Davis | |
| 8,495,288 B2 * | 7/2013 | Hosoya et al. ................ | 711/112 |
| 8,732,401 B2 | 5/2014 | Venkatesh et al. | |

(Continued)

OTHER PUBLICATIONS

U.S. Appl. No. 13/269,503, Office Action, Mailed Nov. 8, 2013, 6 pages.

(Continued)

*Primary Examiner* — John Lane
(74) *Attorney, Agent, or Firm* — Blakely, Sokoloff, Taylor & Zafman LLP

(57) ABSTRACT

Techniques for deduplication of virtual machine files in a virtualized desktop environment are described, including receiving data into a page cache, the data being received from a virtual machine and indicating a write operation, and deduplicating the data in the page cache prior to committing the data to storage, the data being deduplicated in-band and in substantially real-time.

17 Claims, 6 Drawing Sheets

(56) References Cited

U.S. PATENT DOCUMENTS

| | | |
|---|---|---|
| 2002/0124137 A1 | 9/2002 | Ulrich et al. |
| 2004/0111443 A1 | 6/2004 | Wong et al. |
| 2004/0128470 A1* | 7/2004 | Hetzler et al. ............... 711/209 |
| 2005/0038850 A1* | 2/2005 | Oe et al. ..................... 709/203 |
| 2005/0108440 A1 | 5/2005 | Baumberger et al. |
| 2005/0114595 A1 | 5/2005 | Karr et al. |
| 2005/0131900 A1* | 6/2005 | Palliyll et al. ................ 707/10 |
| 2006/0112251 A1 | 5/2006 | Karr et al. |
| 2007/0005935 A1* | 1/2007 | Khosravi et al. ............. 711/216 |
| 2007/0192534 A1 | 8/2007 | Hwang et al. |
| 2007/0248029 A1 | 10/2007 | Merkey et al. |
| 2007/0266037 A1* | 11/2007 | Terry et al. .................. 707/100 |
| 2008/0183986 A1* | 7/2008 | Yehia et al. .................. 711/159 |
| 2009/0063528 A1 | 3/2009 | Yueh |
| 2009/0089337 A1* | 4/2009 | Perlin et al. .................. 707/200 |
| 2009/0254507 A1* | 10/2009 | Hosoya et al. ................ 706/48 |
| 2009/0319772 A1* | 12/2009 | Singh et al. .................. 713/153 |
| 2010/0031000 A1* | 2/2010 | Flynn et al. .................. 711/216 |
| 2010/0064166 A1* | 3/2010 | Dubnicki et al. ............... 714/4 |
| 2010/0070725 A1 | 3/2010 | Prahlad et al. |
| 2010/0180153 A1 | 7/2010 | Jernigan, IV et al. |
| 2010/0181119 A1 | 7/2010 | Saigh et al. |
| 2010/0188273 A1* | 7/2010 | He et al. ....................... 341/87 |
| 2010/0274772 A1 | 10/2010 | Samuels |
| 2010/0306444 A1* | 12/2010 | Shirley et al. .................. 711/6 |
| 2011/0035620 A1 | 2/2011 | Elyashev |
| 2011/0055471 A1* | 3/2011 | Thatcher et al. ............. 711/114 |
| 2011/0071989 A1* | 3/2011 | Wilson et al. ................ 707/692 |
| 2011/0082836 A1 | 4/2011 | Wang et al. |
| 2011/0131390 A1 | 6/2011 | Srinivasan et al. |
| 2011/0145243 A1 | 6/2011 | Yudenfriend |
| 2011/0167045 A1 | 7/2011 | Okamoto |
| 2011/0196900 A1* | 8/2011 | Drobychev et al. ........... 707/812 |
| 2011/0265083 A1 | 10/2011 | Davis |
| 2011/0276781 A1* | 11/2011 | Sengupta et al. ............. 711/216 |
| 2011/0295914 A1 | 12/2011 | Mori |
| 2012/0016845 A1* | 1/2012 | Bates ........................... 707/692 |
| 2012/0054445 A1 | 3/2012 | Swart et al. |
| 2012/0137054 A1* | 5/2012 | Sadri et al. .................... 711/103 |
| 2012/0159115 A1 | 6/2012 | Cha et al. |
| 2012/0254131 A1 | 10/2012 | Kiswany |
| 2013/0013865 A1 | 1/2013 | Venkatesh et al. |
| 2013/0117494 A1 | 5/2013 | Hughes et al. |
| 2013/0124523 A1* | 5/2013 | Rogers et al. ................. 707/737 |
| 2013/0166831 A1 | 6/2013 | Atkisson et al. |
| 2013/0238876 A1* | 9/2013 | Fiske et al. ................... 711/216 |
| 2013/0282627 A1* | 10/2013 | Faddoul et al. ................. 706/12 |
| 2013/0283004 A1 | 10/2013 | Devine et al. |

OTHER PUBLICATIONS

U.S. Appl. No. 13/269,503, Notice of Allowance, Mailed Feb. 25, 2014, 8 pages.

PCT/US2013/076704, International Search Report and Written Opinion, Mailed Aug. 22, 2014.

PCT/US2013/076683, International Search Report and Written Opinion, Mailed May 23, 2014.

* cited by examiner

DEDUPLICATION OF VIRTUAL MACHINE FILES IN A VIRTUALIZED DESKTOP ENVIRONMENT

CROSS-REFERENCE TO RELATED APPLICATIONS

This application is related to U.S. Provisional Patent Application No. 61/505,524, filed Jul. 7, 2011, and entitled "De-Duplication Of Virtual Machine Files In A Virtualized Desktop Environment," which is herein incorporated by reference in its entirety and for all purposes.

FIELD

The present invention relates generally to software, data storage, and virtualized computing and processing resources. More specifically, techniques for deduplication of virtual machine files in a virtualized desktop environment are described.

BACKGROUND

Virtualization is a technology that provides a software-based abstraction to a physical, hardware-based computer. In conventional solutions, an abstraction layer decouples physical hardware components (e.g., central processing unit ("CPU"), memory, disk drives, storage) from an operating system and allows numerous instances to be run side-by-side as virtual machines ("VM") in isolation of each other. In conventional solutions, an operating system within a virtual machine has visibility into and can perform data transactions with a complete, consistent, and normalized set of hardware regardless of the actual individual physical hardware components underneath the software-based abstraction.

Virtual machines, in conventional solutions, are encapsulated as files (also referred to as images) making it possible to save, replay, edit and copy a virtual machine in a manner similar to that of handling a file on a file-system. This capability is fundamental to improving manageability, increasing flexibility, and enabling rapid administration as compared to using physical machines to replace those that are abstracted.

However, virtual machines suffer from significant shortcomings as VM files tend to be large in size and consume large amounts of disk space. Additionally, each VM image is identical to other VMs in conventional desktop usage solutions as most VMs tend to have the same version and identical copy of an operating system, applications, which are typically used in similar ways. Unfortunately, conventional solutions create unnecessary redundancy and overhead as VM files are continuously read from and written to with duplicate (identical and redundant) information. Overhead, in conventional solutions, includes storage capacity overhead (i.e., each virtual machine takes several tens of gigabytes on average to store), storage access overhead (i.e., VMs are typically stored on storage systems that are shared and every time a VM file needs to be read or written to, network and storage resources are required to perform the operation), and network overhead (i.e., transferring data to and from storage systems utilizes network bandwidth and is affected by latency). In some conventional solutions, out-of-band (i.e., using a connection for control data that is different from a connection used for main (e.g., payload) data) or post-processing of data in write operations is limited in that data is first written in its full form and then reduced and re-written to storage, which is resource-intensive for storage and processing resources. Another problem with conventional solutions is that block-level range locking (i.e., preventing two write operations being performed to a given block of data) may be required because a VM may have write operations that are in-flight and not written to storage (i.e., on disk) yet, thus degrading performance and introducing opportunities for conflict or latency. Similarly, some conventional solutions also require block locking because individual blocks could be changed and not affected on disk, which also degrades overall system performance. Similarly, read operations in conventional solutions are inefficient because in-band recomposition or rehydration must occur. A read operation results in reassembly of blocks of data based on indexes, which is both computationally and mechanically intensive (i.e., disk-seek activities are increased). Regarding conventional shared storage systems, additional queuing ensues as multiple applications compete for requests to be serviced by a storage system. As desktops are interactive workloads, these are sensitive to latency and timeouts and, subsequently, network overhead results in poor performance.

Thus, what is needed is a solution for improving data handling in a virtualized desktop environment without the limitations of conventional techniques.

BRIEF DESCRIPTION OF THE DRAWINGS

Various embodiments of the invention are disclosed in the following detailed description and the accompanying drawings.

DETAILED DESCRIPTION

Figure 1A:
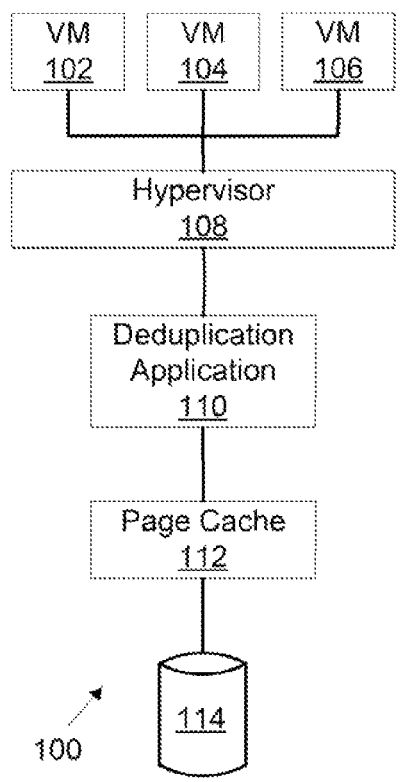
FIG. 1A illustrates an exemplary system for real time deduplication of virtual machine files in a virtualized desktop environment.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. The described techniques may be varied and are not limited to the examples or descriptions provided.

As described herein, techniques for deduplication of virtual machine files in a virtualized desktop environment are described. The described techniques may be performed in real-time or substantially real-time, eliminating redundant and duplicate write operations using a deduplication application. The deduplication techniques described result in sending single instanced data deduplicated desktop Virtual Machine and other types of files in real-time or near real-time to primary storage without querying a primary storage system for information on block layout or locality of reference. Further, the described techniques accelerate the performance of desktop virtual machines by deduplicating and storing less information in the memory of a storage system. In some examples, the described deduplication techniques also reduce congestion and traffic on a IP storage network by deduplicating desktop virtual machine files in real time and eliminating duplicate information from being sent to a primary storage system. Still further, deduplicated files may be stored without requiring reassembly of data for read operations. Additionally, deduplicated virtual machine images and data enables faster system performance by eliminating the need for disk-level range locks and block-level locks.

FIG. 1A illustrates an exemplary system for real time deduplication of virtual machine files in a virtualized desktop environment. Here, system 100 includes virtual machines (hereafter "VM"s) 102-106, hypervisor 108, deduplication application 110, page cache 112, and primary storage 114. The number, type, configuration, topology, connections, or other aspects of system 100 may be varied and are not limited to the examples shown and described. In some examples, VMs 102-106 may be instances of an operating system running on various types of hardware, software, circuitry, or a combination thereof (e.g., x86 servers) that are managed by hypervisor 108. As shown, deduplication application 110 may be used to deduplicate data to be written to primary storage 114 using page cache 112 as a memory into which data may be read or written before being asynchronously (or, in some examples, synchronously) written back to primary storage 114. Further, primary storage 114 may be implemented as any type of data storage facility such as those described herein (e.g., SAN, NAS, RAID, disk drives, and others, without limitation).

Here, deduplication application 110 is configured to handle potential partial updates of a 4 Kilobyte (hereafter "Kb") block. Since VMs 102-106 may be configured to perform write operations of variable length up to 4 Kb, deduplication application 110 may be likewise configured to perform write operations where a partial update to a full 4 Kb block is requested. In some examples, a partial update may be of any fragment size of 4 Kb or less. Block writes may be performed that are smaller than 4 Kb in size, resulting in a read operation that reads into memory (i.e., page cache 112) a copy of the original data block being pointed to by a buffer head (i.e., metadata associated with a given data block) and a partial write superimposed on the data block copy for updating purposes.

In some examples, write operations and changes may be made against in-memory (i.e., stored in page cache 112) data structures, preventing actual changes to data stored in primary storage 114. As shown, data written to in page cache 112 may be asynchronously, in some examples, written to disk (e.g., primary storage 114) using a "flush" process that commits unsaved memory segments to primary storage 114, which may also be referred to as "lazy" writing.

Further, deduplication application 110 may be configured to not re-assemble de-duplicated data when a read operation is issued by VMs 102-106, which improves efficiency and performance by avoiding the need to disassemble and re-assemble related data blocks with read operations.

As described herein, deduplication application 110 removes duplicate (i.e., redundant) information in VM files in a read or write path of a Virtualized Desktop Environment (i.e., Virtual Desktop Infrastructure ("VDI")/Hosted Virtual Desktop ("HVD")). In some examples, a virtualized desktop environment may be composed of VMs 102-106 running a desktop operating system (e.g., Windows XP or Windows 7 Enterprise as developed by Microsoft Corporation of Redmond, Wash.) on a virtualized hardware layer (such as those provided by VM Ware or Citrix or Microsoft or Redhat). A virtualized layer (e.g., hypervisor 108) provides memory, disk (e.g., storage) and processing (i.e., CPU) resources to VMs 102-106. A virtual desktop VM accesses storage, which may be enabled by deduplication application 110. As shown, deduplication application 110 may be configured to identify and remove duplicate (redundant) information with pointers to a single copy of data while a write operation from one or more of VMs 102-106 is still "in-flight" (i.e., sent to, but not written to permanent storage or disk (hereafter referred to as "primary storage")) and in a Random Access Memory ("RAM") of a deduplication application. In some examples, deduplication application 110 may be configured to perform operations (e.g., read, write, copy on write, and others) on blocks of fixed lengths and process data "inline" (i.e., in the data path or connection between a VM and primary storage) in real time or near time (i.e., substantially real-time).

As shown, deduplication application 110 may be configured to provide an inline and real-time or substantially real-time deduplication of data as the data is in-flight from one or more of VMs 102-106 to primary storage system (e.g., primary storage 114). In some examples, a primary storage system may be implemented using a computer hard disk based on rotational spindle, a computer hard disk based on Solid State Technologies, a redundant array of independent disks (hereafter "RAID") storage system that aggregates multiple computer hard disks, a storage area network (hereafter "SAN"), network attached storage (hereafter "NAS") that aggregates multiple RAID storage systems, among others.

Figure 1B:
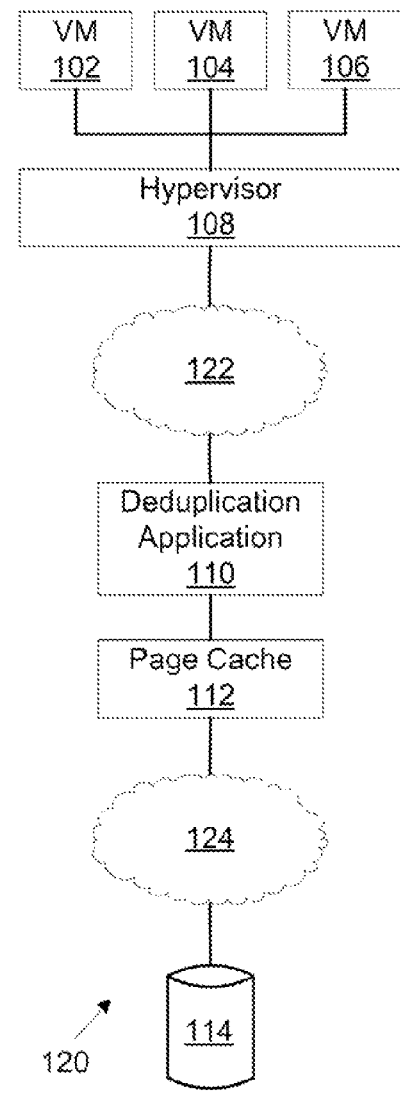
FIG. 1B illustrates an alternative exemplary system for real time deduplication of virtual machine files in a virtualized desktop environment.

FIG. 1B illustrates an alternative exemplary system for real time deduplication of virtual machine files in a virtualized desktop environment. Here, system 120 includes virtual machines (hereafter "VM"s) 102-106, hypervisor 108, deduplication application 110, page cache 112, primary storage 114, networks 122-124. The number, type, configuration, topology, connections, or other aspects of system 120 may be varied and are not limited to the examples shown and described. In some examples, data networks such as networks 122-124 may be implemented in the data path from VMs 102-106 to primary storage 114 through deduplication application 110. Further, networks 122-124 may be implemented as any type of data network, including a local area network ("LAN"), wide area network ("WAN"), wireless local area network ("WLAN"), computing cloud, storage cloud, and others, without limitation.

Figure 2:
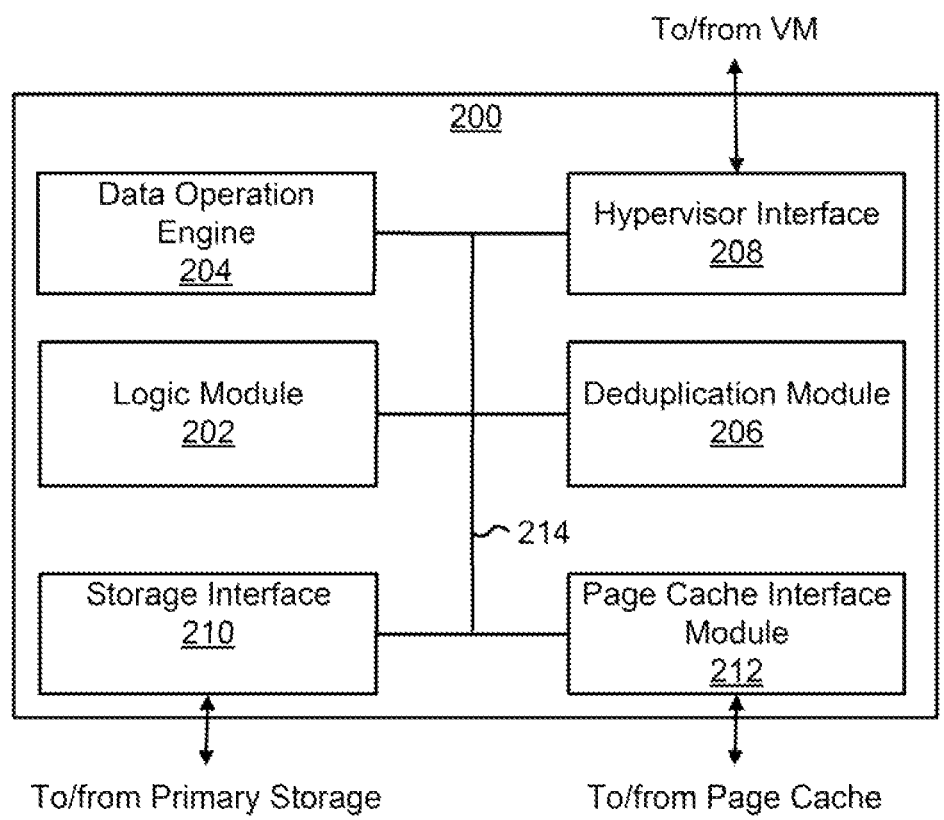
FIG. 2 illustrates an exemplary application architecture for real time deduplication of virtual machine files in a virtualized desktop environment.

FIG. 2 illustrates an exemplary application architecture for real time deduplication of virtual machine files in a virtualized desktop environment. Here, deduplication application 200 is shown, including logic module 202, data operation engine 204, deduplication module 206, storage interface 210, page cache interface module 212, and bus 214. The quantity, type, configuration, design, layout, size, or other aspects of deduplication application 200, logic module 202, data operation engine 204, deduplication module 206, storage interface 210, page cache interface module 212, and bus 214 may be varied without limitation and the examples shown are provided for purposes of illustrating the described techniques. Deduplication application 200 and the above-listed elements may be implemented as a single, standalone, or distributed application in software, hardware, circuitry, or a combination thereof, without limitation.

As shown, logic module 202 may be implemented and configured to generate control signals to one or more of data operation engine 204, deduplication module 206, storage interface 210, and page cache interface module 212. In some examples, control signals may be sent from logic module 202 over bus 214 to data operation 204 to perform read or write operations on data retrieved from primary storage (FIGS. 1A-1B) using storage interface 210. When read or copied for write (i.e., copy on write) operations, data may be stored in page cache 112 (FIGS. 1A-1B) using page cache interface module 212. Once stored in page cache 112, deduplication module 206 may be configured to deduplicate data from VMs 102-106 (FIGS. 1A-1B) as retrieved using hypervisor 208 and using the techniques described herein.

Figure 3A:
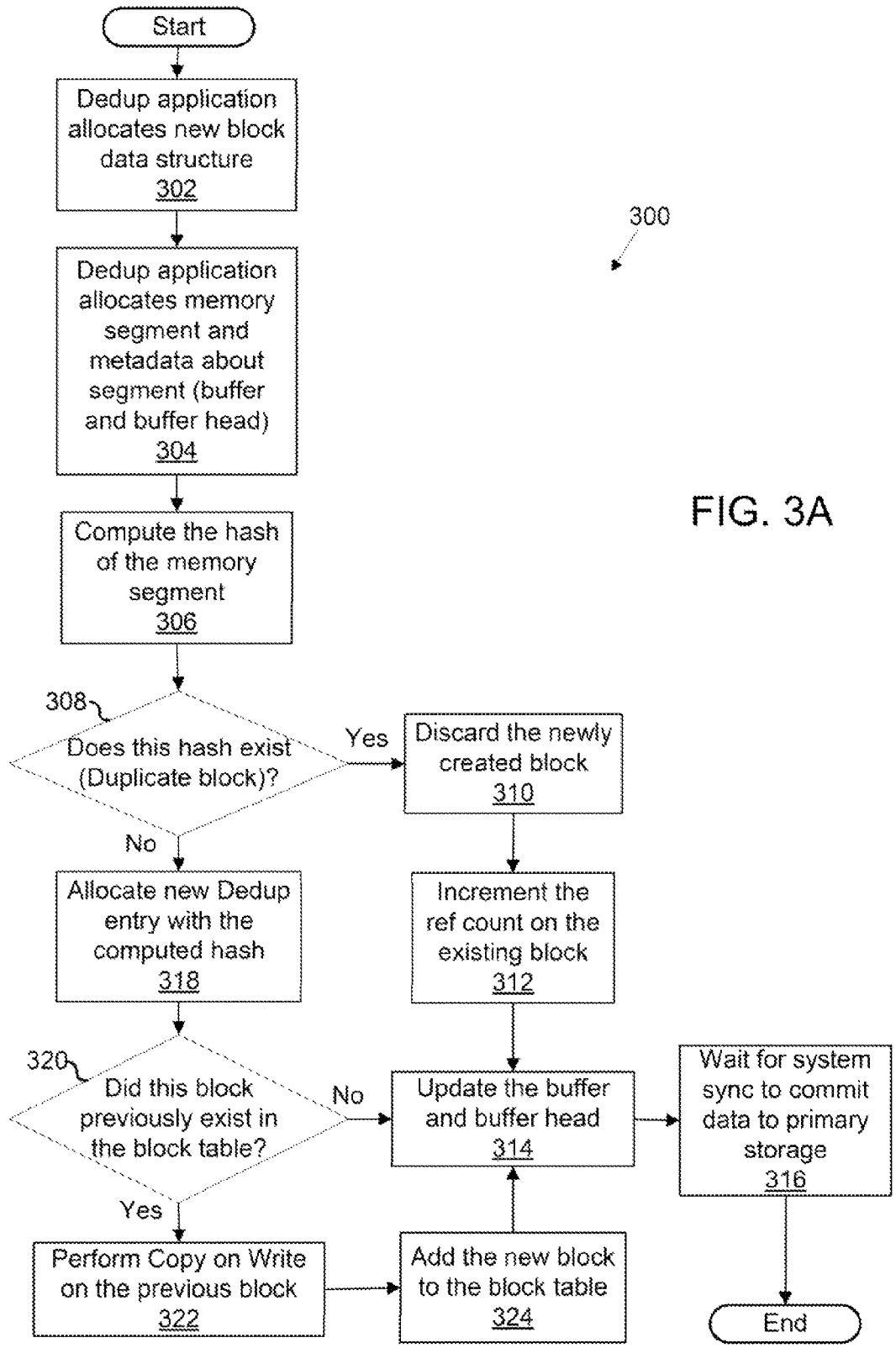
FIG. 3A illustrates an exemplary deduplication process.

FIG. 3A illustrates an exemplary deduplication process. Here, the deduplication process begins when a Desktop Virtual Machine (e.g., VM 102-106 (FIGS. 1A-1B) performs a write operation on its virtual hard disk file or image (not shown). The write operation is forwarded by virtualization software (e.g., hypervisor 108 (FIGS. 1A-1B) to a deduplication application (e.g., deduplication application 110 (FIGS. 1A-1B)). In some examples, deduplication application 110 starts the processing of a write operation by first allocating a new block data structure (302). As used herein, a data block refers to a block data structure that represents the smallest atomic unit of storage operated upon by deduplication application 110. A block data structure may also be used to store the content of a write operation made by VMs 102-106. Subsequent to the creation of a block data structure, two additional data structures are constructed on two different segments of memory.

As shown, a first segment of memory (referred to as a buffer head) is created to contain information about a given data block (i.e., metadata), including a block number. A second segment (referred to as a buffer) may be created to contain the content (i.e., payload) of a write operation (304).

Here, a hashing function may be used to compute a one-way hash for a buffer (i.e., the content of a given data block targeted for the performance of a read or write operation) (306). A determination is then made in the form of a lookup of the hash value to determine whether the hash is found in a memory index of key value pairs (308). If the hash exists (i.e., is found in a memory index), a conclusion is made that the write operation is a duplicate (i.e. already exists). If the write operation is a duplicate, the newly created block is discarded (310). Further, a lookup operation is performed of the value of the hash key to identify a reference to a parent block (i.e., the first block of unique data) (312). Reduplication application 110 then changes an inode (i.e., a file-system accounting data structure) to reference the block to point to the parent block content and increment a reference counter (ref count) that is configured to keep a count of the number of copies or duplicates that exist for a given block. A buffer and buffer head are then updated (314). Subsequently, the data is then written asynchronously to primary storage at a given commit time (316).

Alternatively, if a hash does not exist in a memory index, then the write operation is to be performed on a new block of data to be used by deduplication application 110 (318). If the write operation is unique, then a buffer head data structure is inspected to distinguish if the write operation is a write to a new block or a modification to an already existing block (320). If this is a new block, then the inode is modified with a reference to the new block and the reference count is set to "1" (314). If this write is a modification to an existing data block, but results in a new hash, the existing data block can be referenced by other data blocks. Subsequently, a copy on write operation is performed to keep the content of an existing data block intact with its reference count decrement by "1" to account for the block not referencing the existing data block (322). Further, a new data block is allocated and the reference count set to the new data block is set to "1" (324). Accordingly, an inode is modified accordingly, the buffer and buffer head are updated (314) and the data is committed to primary storage asynchronously (316). In other examples, the above-described process may be varied in steps, order, function, processes, or other aspects, and is not limited to those shown and described.

Figure 3B:
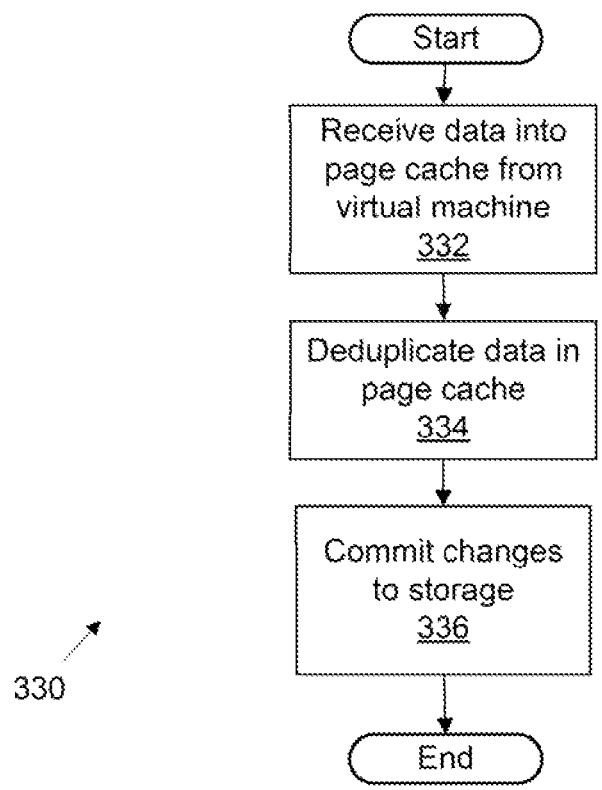
FIG. 3B illustrates an alternative exemplary deduplication process.

FIG. 3B illustrates an alternative exemplary deduplication process. Here, process 330 begins when data is received into a page cache (e.g., page cache 112 (FIGS. 1A-1B)) from one or more virtual machines (e.g., VMs 102-106 (FIGS. 1A-1B) (332). Once placed in page cache 112, data is deduplicated using the techniques described herein by, for example, deduplication application 110 (FIGS. 1A-1B) (334). After deduplicating the data in page cache 112, the changed (i.e., updated, written, overwritten, or the like) data is committed to storage (e.g., primary storage 114 (FIGS. 1A-1B)). In other examples, the above-described process may be varied in steps, order, function, processes, or other aspects, and is not limited to those shown and described.

Figure 4:
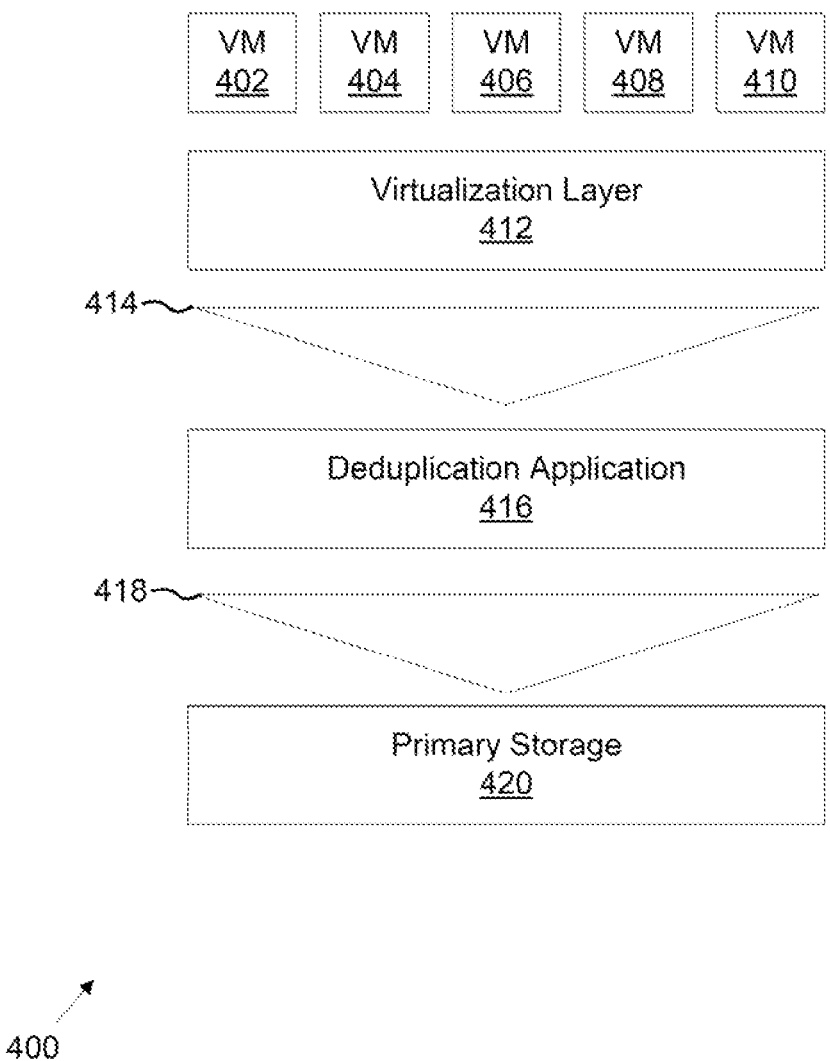
FIG. 4 illustrates an exemplary data path for real time deduplication of virtual machine files in a virtualized desktop environment.

FIG. 4 illustrates an exemplary data path for real time deduplication of virtual machine files in a virtualized desktop environment. Here, exemplary data path 400 includes VMs 402-410, virtualization layer 412, arrow 414, deduplication application 416, arrow 418, and primary storage 420. In some examples, VMs 402-410 may be implemented as desktop VMs using desktop operating systems such as Windows 7 or Windows XP running in a fully isolated environment and "side-by-side" (i.e., in parallel) on virtualization layer 412. As used herein, virtualization layer 412 may be implemented as software that is configured to abstract the hardware of a server (e.g., x86 server, or others) allowing multiple isolated VMs (e.g., VMs 402-410) to run in isolation (i.e., full, partial, or complete) and side-by-side (i.e., a "hypervisor," virtual machine monitor ("VMM"), or the like). In some examples, deduplication application 416 may be implemented as described above in connection with FIGS. 1A-3B, and is also part of data path 400. Further, primary storage 420 may be a storage system such as a single or multiple disk drives in a RAID, SAN, or NAS storage configuration.

In some examples, deduplication application 416 runs inline in data path 400 between virtualization layer 412 running VMs 402-410 and primary storage 420. Thus, deduplication application may be configured to act like a proxy to primary storage 420. While deduplication application 416 proxies primary storage 420, it may be configured to not store data or, in other examples, to store data. As shown, deduplication application 416 may be configured to identify a mount point or location at which virtualization layer 412 may be configured to read data from and write data to primary storage 420. Further, a mount point may be accessible using various types of file system or block storage protocols such as Network File System ("NFS"), Common Internet File-system ("CIFS"), Internet Small Computer Systems Interface ("iSCSI"), Network Block Device ("NBD"), or others, without limitation.

As shown, VMs 402-410 perform read and write operations from/to hard drives (not shown), which may be performed by reading or writing files, images, records, or other forms of data. In some examples, these read and write operations may be forwarded by 412 virtualization layer (e.g., a hypervisor) to a storage device (e.g., primary storage 420). As an inline (i.e., in data path 400 disposed between virtualization layer 412 and primary storage 420) and proxy to primary storage 420, read and write operations from virtualization layer 412 may be forwarded (i.e., received by, intercepted, copied, sampled, or otherwise made visible) to deduplication application 416 before reaching primary storage 420. Write operations, as an example, may be performed in-band, as VMs 402-410 write data to primary storage 420. Further, read operations may be performed not in path (i.e., out of data path 400). For example, read operations may be performed without the need for looking up deduplication-related metadata (which may be stored in a buffer head) or reassembling data blocks based on key value pairs, which increases performance speeds. Data may be reduced as it is processed (e.g., deduplicated) by deduplication application 416 and written to primary storage 416. In some examples, deduplication application 416 may be configured to handle write operations differently from read operations. In other examples, deduplication application 416 may also be configured to handle write operations similarly to read operations.

As shown, deduplication application 416 processes write input/output (hereafter "IO") operations on a memory-based cache layer (hereafter referred to as a page cache (e.g., page cache 112 (FIG. 1A-1B)). As write IO operations from one or more of VMs 402-410 are received by deduplication application 416, re-parenting of a data block to a parent block may be performed if the data block is a duplicate in the page cache, thus eliminating the need for an out-of-band (e.g., using a connection for control data that is different than a connection used for main data) technique. In some examples, an "out-of-band" technique may include retrieving a data block from a disk (i.e., primary storage 420), read into memory (i.e., into page cache 112; in some examples, page cache 112 may or may not be locked to prevent updates), changed, and commit for a write operation back to the disk, either asynchronously or otherwise (e.g., in real time or near real-time). Instead, deduplication application 416 eliminates a need to do disk-level and block-level range locking by performing deduplication (i.e., removing duplicate entries from a data block and pointing them to a first occurrence of the content associated with that data block) in page cache 112 (i.e., a memory associated with deduplication application 416, which may be implemented using a virtual machine). In other words, block-level range locking is unnecessary because write blocks may be deduplicated in page cache 112 instead of range locking primary storage 420, thus improving performance. Likewise, block locking is not required because data blocks for write operations are deduplicated in memory (i.e., page cache 112), which improves performance by not preventing access to a given data block in primary storage 420.

In some examples, changes to data in primary storage 420 may be made in the same commit cycle as if deduplication application 416 was not part of data path 400. Subsequently, significant improvements in performance and processing capacity created by deduplication application 416 may be useful and relevant to primary storage 420 and real-time or other types of applications. The use of deduplication techniques described herein enables in-band processing for highly IO-intensive data operations and transactions (e.g., read, write, and other types of workloads) without using expensive, customized hardware solutions. Further, the deduplication techniques described herein also enables IO-intensive virtualization data operations and transactions to be run on a deduplication appliance (e.g., deduplication application 416) as a VM on inexpensive, non-custom or specialized hardware (e.g., servers such as an Intel x86 servers). In other examples, data path 400 and the above-described elements and layers may be varied and are not limited to those shown and described.

Figure 5:
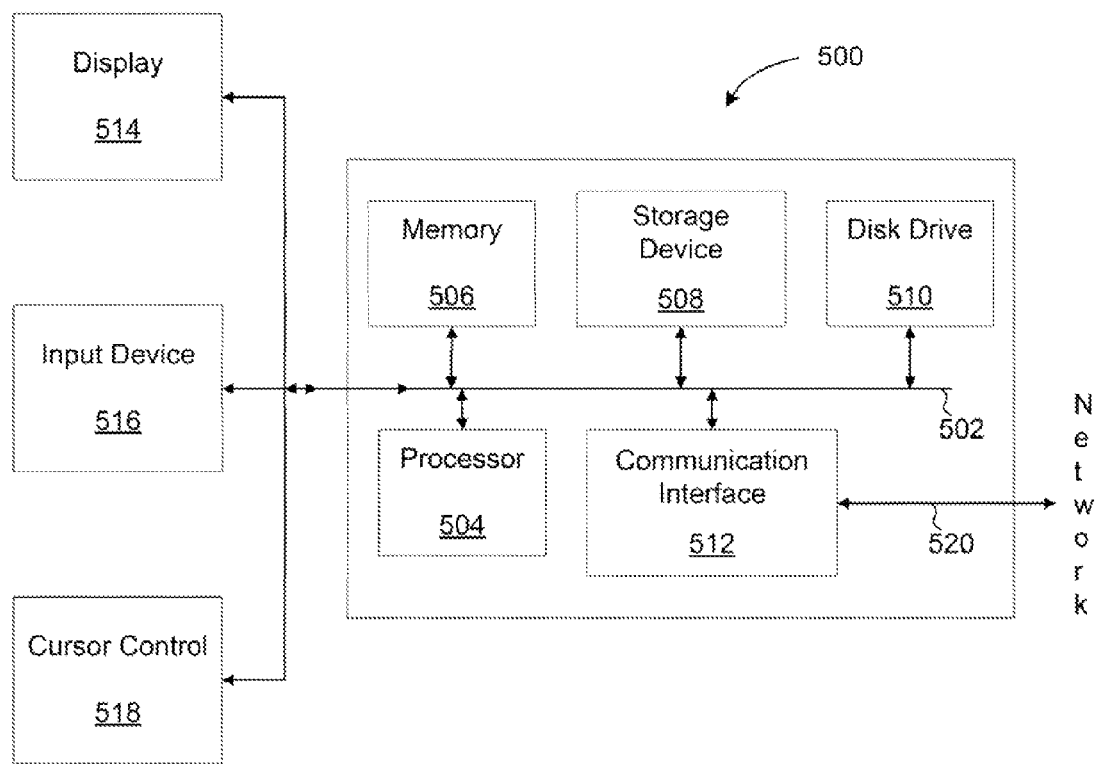
FIG. 5 illustrates an exemplary computer system suitable for real time deduplication of virtual machine files in a virtualized desktop environment.

FIG. 5 illustrates an exemplary computer system suitable for real time deduplication of virtual machine files in a virtualized desktop environment. In some examples, computer system 500 may be used to implement computer programs, applications, methods, processes, or other software to perform the above-described techniques. Computer system 500 includes a bus 502 or other communication mechanism for communicating information, which interconnects subsystems and devices, such as processor 504, system memory 506 (e.g., RAM), storage device 508 (e.g., ROM), disk drive 510 (e.g., magnetic or optical), communication interface 512 (e.g., modem or Ethernet card), display 514 (e.g., CRT or LCD), input device 516 (e.g., keyboard), and cursor control 518 (e.g., mouse or trackball).

According to some examples, computer system 500 performs specific operations by processor 504 executing one or more sequences of one or more instructions stored in system memory 506. Such instructions may be read into system memory 506 from another computer readable medium, such as static storage device 508 or disk drive 510. In some examples, hard-wired circuitry may be used in place of or in combination with software instructions for implementation.

The term "computer readable medium" refers to any tangible medium that participates in providing instructions to processor 504 for execution. Such a medium may take many forms, including but not limited to, non-volatile media and volatile media. Non-volatile media includes, for example, optical or magnetic disks, such as disk drive 510. Volatile media includes dynamic memory, such as system memory 506.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 502 for transmitting a computer data signal.

In some examples, execution of the sequences of instructions may be performed by a single computer system 500. According to some examples, two or more computer systems 500 coupled by communication link 520 (e.g., LAN, PSTN, or wireless network) may perform the sequence of instructions in coordination with one another. Computer system 500 may transmit and receive messages, data, and instructions, including program, i.e., application code, through communication link 520 and communication interface 512. Received program code may be executed by processor 504 as it is received, and/or stored in disk drive 510, or other non-volatile storage for later execution.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
   receiving, at a deduplication application in a read-write path of a virtualized computing environment between a plurality of a virtual machines and a primary storage of the virtualized computing environment, a write operation and data associated with the write operation from a virtual machine, and a read operation and an indication of data requested with the read operation from a second virtual machine, wherein the write operation and data are received by the deduplication application in the read-write path prior to storage of the data in the primary storage of the virtualized computing environment;
   receiving data into a cache memory of the deduplication application, the data being received from the deduplication application and indicating the write operation of the virtual machine, wherein the cache memory of the deduplication application is deployed in the read-write path of a virtualized computing environment; and
   deduplicating the data in the cache memory by the deduplication application in substantially real-time in response to the write operation and prior to committing the data to a data block of the primary storage, the data being deduplicated in-band in the read-write path between the virtual machine and the primary non-volatile storage while providing access to the data block in the primary storage during the deduplicating and in response to the read operation.

2. The method of claim 1, wherein deduplicating the data in the cache memory of the deduplication application further comprises performing a lookup operation of a hash in a memory index, the hash being associated with a buffer generated during the deduplicating.

3. The method of claim 1, wherein deduplicating the data in the cache memory of the deduplication application further comprises in response to the write operation, generating a data structure associated with a buffer head, and generating another data structure associated with a buffer.

4. The method of claim 3, further comprising generating a hash associated with the buffer.

5. The method of claim 4, further comprising performing a lookup operation associated with the hash, the lookup operation being configured to determine whether the hash is found in a memory index.

6. The method of claim 5, wherein if the hash is found in the memory index, performing a lookup of a reference to a parent data block and modifying an inode associated with the data to point to the parent data block and incrementing a reference counter associated with the parent data block.

7. The method of claim 5, wherein if the hash is not found in the memory index, inspecting the buffer head to determine if the operation is associated with writing a new data block or modifying an existing data block.

8. The method of claim 7, wherein if the operation is associated with the writing the new data block, modifying another inode associated with the new data block to refer to the new data block and establishing another reference counter with a value of "1."

9. The method of claim 7, wherein if the operation is associated with the modifying the existing data block, generating another hash associated with the existing data block and performing a copy on write operation, decrementing a further reference counter associated with the existing data block, allocating another new data block and another new data block reference counter, and modifying another inode associated with the new data block.

10. The method of claim 4, wherein the data block is read into the cache memory of the deduplication application and the write operation is performed on the data block to generate an updated data block, the updated data block being written to the primary storage asynchronously.

11. The method of claim 1, further comprising determining whether the write operation is associated with a data block of less than 4 kilobytes.

12. A system, comprising:
    a cache memory of a deduplication application configured to store data received from a plurality of virtual machines and indicating a write operation, wherein the cache memory of the deduplication application is deployed in a read-write path of a virtualized computing environment between the plurality of virtual machines and a primary storage of the virtualized computing environment; and
    a processor to execute the deduplication application configured
       to receive a write operation and data associated with the write operation from a virtual machine, and to receive a read operation and an indication of data requested with the read operation from a second virtual machine, wherein the write operation and data are received by the deduplication application in the read-write path prior to storage of the data in a primary storage of the virtualized computing environment,
       to receive the data into the cache memory of the deduplication application, the data being received from the deduplication application and indicating the write operation of the virtual machine, and
       to deduplicate the data in the cache memory of the deduplication application in substantially real-time in response to the write operation and prior to committing the data to the primary storage, the data being deduplicated in-band in the read-write path between the virtual machine and the primary storage while access to the data block in the primary storage is provided during the deduplication and in response to the read operation.

13. The system of claim 12, wherein the processor further comprises the deduplication application configured to deduplicate the data inline in a data path between the primary non-volatile storage of the virtualized computing environment and a virtualization software abstraction layer.

14. The system of claim 12, wherein the processor further comprises the deduplication application configured to deduplicate the data inline in a data path between the primary storage of the virtualized computing environment and a hypervisor.

15. The system of claim 12, wherein the data is associated with a virtual machine file.

16. The system of claim 12, wherein the data is associated with one or more virtual machine files, the data being deduplicated in real time as changes are made by the virtual machine to at least one of the one or more of virtual machines files.

17. A non-transitory computer program product embodied in a computer readable medium and comprising computer instructions for:

receiving, at a deduplication application in a read-write path of a virtualized computing environment between a plurality of virtual machines and a primary storage of the virtualized computing environment, a write operation and data associated with the write operation from the virtual machine, and a read operation and an indication of data requested with the read operation from a second virtual machine, wherein the write operation and data are received by the deduplication application in the read-write path prior to storage of the data in the primary storage of the virtualized computing environment;

receiving data into a cache memory of the deduplication application, the data being received from the deduplication application and indicating the write operation of the virtual machine, wherein the cache memory of the deduplication application is deployed in the read-write path of a virtualized computing environment; and deduplicating the data in the cache memory by the deduplication application in substantially real-time in response to the write operation and prior to committing the data to the primary storage, the data being deduplicated in-band in the read-write path between the virtual machine and the primary storage while providing access to the data block in the primary storage during the deduplication and in response to the read operation.

* * * * *